Dec. 22, 1931.  G. BECKER  1,837,942
TREE MOVER
Filed March 12, 1930
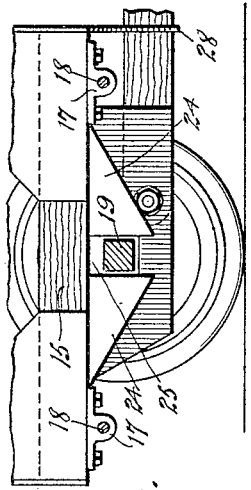
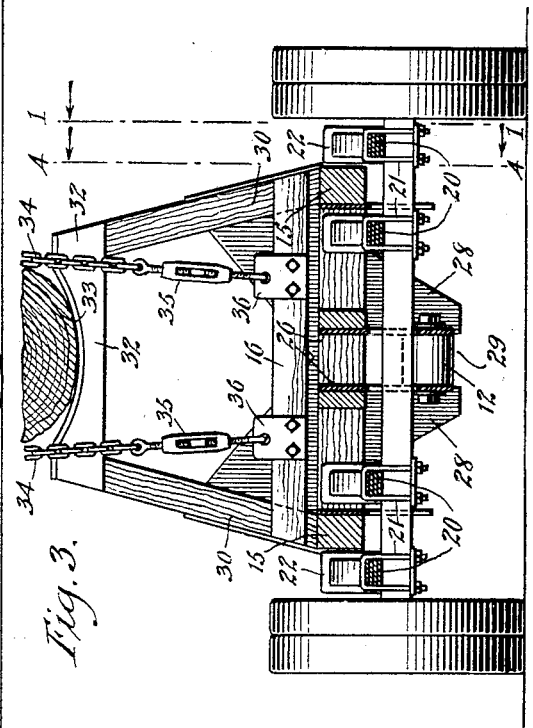
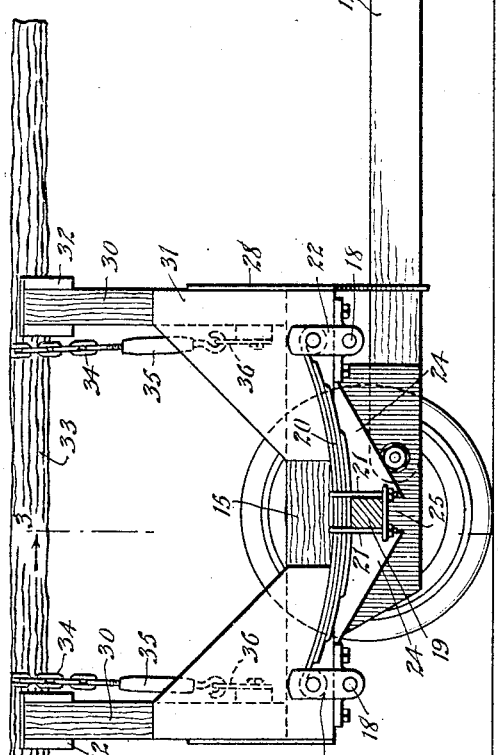
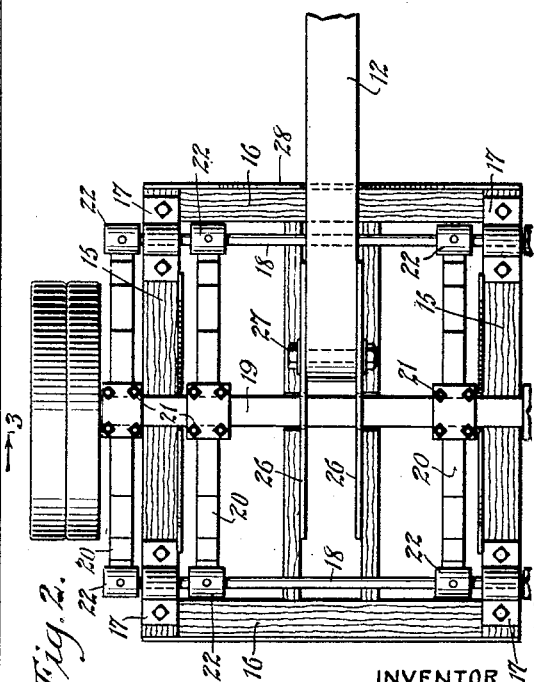
WITNESSES
Edw. Thorpe
INVENTOR
George Becker
BY Munn & Co
ATTORNEYS Patented Dec. 22, 1931

1,837,942

UNITED STATES PATENT OFFICE

GEORGE BECKER, OF SEACLIFF, NEW YORK

TREE MOVER

Application filed March 12, 1930. Serial No. 435,312.

This invention relates to tree movers.

It is among the objects of the present invention to provide a novel and improved truck or tree mover which will be simple in construction and operation, strong and durable, and particularly adapted to meet the demands of economic manufacture.

Another object of the present invention is to provide in a tree mover improved spring suspension by which the body is retained above the truck axle and resiliently spaced therefrom, means being provided for guiding the body for vertical movement with respect to the axle, and for preventing rocking movement of the truck body with respect to the axle.

A further object of the present invention is to provide in a tree mover improved coupling means for the truck reach, the arrangement being such that the reach may be readily disconnected and the construction provides guided means for the reach whereby it will act to guide vertical movement of the truck body to prevent turning movement of the axle or body with respect to the reach.

Other important objects of the present invention include novel and improved construction and interrelation of parts, whereby improved structural features are provided.

Numerous other objects and features of the present invention will be apparent from a consideration of the following specification taken in connection with the accompanying drawings, in which—

Figure 1 is a side elevation partly in section as indicated by the line 1—1 in Figure 3;

Figure 2 is a bottom plan view of the form of the invention shown in Figure 1;

Figure 3 is a vertical section taken on the line 3—3 of Figure 1; and

Figure 4 is a sectional view taken on the line 4—4 of Figure 3.

Referring more particularly to the drawings, and to the form of the invention presented therein by way of illustration, the same includes a front draft truck which may be of any conventional construction. The draft truck here shown includes a cross axle 10 from which draft links 11 extend. The forward end of the reach 12 is connected with the draft truck by the provision of upper and lower connecting plates 13 which receive the axle 10 therebetween and are adapted to be joined by a suitable bolt or king pin 14 through a receiving shackle of the front of the axle. It will be understood that the present invention is not confined to any specific type of draft truck, and that if desired the forward end of the reach may be directly associated with a tractor or equivalent means.

The truck of the tree mover includes a body structure formed by side rails 15 which are joined at their extremities with forward and rear rails 16. The under side of the side rails 15 are provided with bearing boxes 17 which receive therethrough suspension rods 18, the rods extending the entire transverse distance of the body and protruding therebeyond through the bearing boxes 17. For supporting the body in resilient spaced relation above the wheeled axle 19 of the tree mover semi-elliptic leaf springs 20 or their equivalent are provided. The springs 20 are connected with the axle by the usual spring clips 21, a pair of such springs being mounted on either side of the side rails 15. The ends of the springs are joined with the rods 18 by connecting shackles 22, the arrangement being such that each side rail is provided on either side with a pair of springs, the side rails being supported by upward lift through the shackles 22, the shackles being pivotally associated with both the spring ends and the rods 18, whereby free pivotal movement thereof is provided for in response to flexing of the spring.

By the spring construction herein set forth it will be seen that the truck body is relatively movable both forwardly and inwardly with respect to the axle 19. To prevent such angular movement with respect to the axle 19 guide plates 24 are provided on the inner face of each of the rails 15. As indicated in Figures 1 and 4 the plates extend downwardly from the rails and are cut out as at 25 to receive the axle therein for free vertical movement with respect to the side rails. The axle is transversely rectangular or equivalently angular so that cooperation of the axle with the cut out recesses of the side plates is such as to prevent turning or angular movement of the body with respect to the axle.

The axle is further guided to forward movement with respect to the body by the provision of depending hounds 26 which have centrally elongated apertures corresponding with the recesses of the side plates, the axle being received through the apertures for cooperative movement therein. The hounds are further provided with registering apertures through which a securing bolt 27 may pass to secure the rear end of the reach 12. By this construction it will be seen that the hounds provide elongated bearing plates for the sides of the reach so that turning movement thereof will effect turning movement of the axle in response thereto.

For further guiding the reach and insuring relative movement of the reach with the axle a transverse guide plate 28 is provided the lower edge of which is recessed as at 29 in Figure 3 to receive the reach therethrough. The recesses of the transverse plate conform substantially to the configuration in the reach, whereby cooperative movement of the reach end plate is effected.

The structure of the tree mover is completed by the provision of pairs of upwardly and inwardly extending supporting arms 30 mounted upon the extremities of the side rails 15. The corners of the body are provided with reinforcing plates 31 which cooperate with the supports 30 to provide a strong and effective supporting structure. The upper extremities of the supports 30 are provided with a cross saddle member 32 which is adapted to receive therein the trunk of the tree 33. The tree may be secured within the saddle 32 by suitable securing chains 34, the lower end of which are joined by turn buckles 35 with apertured securing plates 36 mounted upon the transverse rails 16.

From the foregoing it will readily be seen that the present invention provides a simple, efficient and strong structure.

It will be further seen that the tree mover provides spring suspension for the body and thus for the tree supported thereon, while at the same time preventing any rocking or angular movement of the body or supported tree with respect to the axle, the guide plates permitting only direct vertical movement of the body with respect to the axle.

It will further be seen that the recessed hounds and the front guide plate provide an effective reach connection whereby turning movement is imparted to the axle in direct response to the turning of the forward truck.

It will be understood that the present invention is not specifically confined to detailed structural features as illustrated herein, but that numerous changes, modifications and the full use of equivalents may readily be resorted to without departing from the spirit or scope of the present invention as outlined in the appended claims.

What I claim is:

1. A tree moving truck including a wheeled axle, a plurality of pairs of springs carried by said axle, and a truck body supported by said springs in vertical spaced relation to said axle, said body including a pair of side rails, said rails being positioned adjacent said springs, said rails being connected with said springs by shackles associated with the ends of said springs, the lower ends of said shackles being connected with transverse bars mounted within bearing houses carried by the under side of said rails, said body also including a plurality of depending members straddling said axle including a pair of hounds adapted to receive therebetween the ends of a reach, a bolt extending through said hounds for connecting said reach to the hounds, and means spaced from the hounds straddling said reach for preventing side strain on the hounds.

2. A tree moving truck including a wheeled axle, a plurality of pairs of springs carried by said axle, and a truck body supported by said springs in vertical spaced relation to said axle, said body including a pair of side rails, said rails being positioned between the springs of each pair, said rails being connected with said springs by shackles associated with the ends of said springs, the lower ends of said shackles being connected with transverse bars mounted within bearing houses carried by the under side of said rails, means depending from said rails forming hounds adapted to straddle the axle to permit independent up and down movement thereof, means for connecting the end of a reach to said hounds, and a member acting on the reach for preventing the reach exerting side strain on the hounds when the truck is being turned.

3. A tree moving truck including a wheeled axle, a plurality of pairs of springs carried by said axle, and a truck body supported by said springs in vertical spaced relation to said axle, said body including a pair of side rails, said rails being positioned between the springs of each pair, said rails being connected with said springs by shackles associated with the ends of said springs, the lower ends of said shackles being connected with the tranverse bars mounted within bearing houses carried by the under side of said rails, said body further including recessed depending plates carried by said side rails, the recesses of such plates receiving said axle for vertical guided movement therein, said means further including depending hounds carried by said body, said hounds being recessed to receive the axle for vertical movement therein, and being further recessed to receive a connecting bolt for securing a reach therebetween.

4. A tree-moving truck including a wheeled axle, a body, means for mounting said body on said axle, a pair of hounds connected to the lower part of the body, said hounds being notched to permit free up and down movement of said axle, and a bolt connecting said hounds acting as means for connecting a reach with said hounds.

5. A tree-moving truck including a wheeled axle, a tree-receiving body carried by said axle, a pair of hounds depending from said body, a notched plate connected with said body and depending therefrom, said notched plate being in line with the space between said hounds, and a bolt connecting said hounds, said bolt acting to connect a reach to said hounds, said reach being adapted to be extended through said notched plate and between the hounds whereby the notched plate and the hounds will cause the reach to turn said axle when the reach is turned.

GEORGE BECKER.